United States Patent [19]

Lee et al.

[11] Patent Number: 4,806,841

[45] Date of Patent: Feb. 21, 1989

[54] CONSTANT SPEED AND FREQUENCY GENERATING SYSTEM

[75] Inventors: Robert H. Lee, Fullerton; Alexander Levran, Los Angeles, both of Calif.

[73] Assignee: Teledyne Inet, Torrance, Calif.

[21] Appl. No.: 162,025

[22] Filed: Feb. 29, 1988

[51] Int. Cl.[4] .......................... H02P 9/30; H02P 9/42; H02K 7/10

[52] U.S. Cl. ........................ 322/29; 322/32; 322/39; 310/68 D

[58] Field of Search ....................... 322/29, 32, 39, 10; 310/68 D

[56] References Cited

U.S. PATENT DOCUMENTS

| | | | |
|---|---|---|---|
| 2,854,617 | 9/1958 | Johnson | 322/32 |
| 3,164,769 | 1/1965 | Anderson | 322/32 |
| 4,229,689 | 10/1980 | Nickoladze | 322/32 |
| 4,625,160 | 11/1986 | Hucker | 322/32 |
| 4,723,106 | 2/1988 | Gibbs et al. | 310/68 D X |

Primary Examiner—R. J. Hickey
Attorney, Agent, or Firm—Monty Koslover Associates

[57] ABSTRACT

An output frequency control circuit is mounted on the rotating shaft connecting a motor and generator. The motor-generator system includes exciter circuits, an input power factor control and an output voltage regulator. The input power factor control ensures that the motor input power factor is unity, which is desirable for motor control. The frequency control circuit responds to variations in the AC power source frequency by generating low frequency excitation to boost or buck the operational speed of the machine, causing the generator output frequency to remain constant at a selected frequency output irrespective of input power source frequency variation. The output frequency may be selected over a given range from a control panel adjustment pot.

The major innovation is that the entire frequency control circuit is shaft-mounted and requires no slip-rings or magnetic transformers for signal transfer, thus reducing the possibilities of mechanical failure. A second innovation is that the motor input power factor is held at unity. A third innovation is that the system is enabled to ride through 'brownouts' or short term input power failure.

4 Claims, 3 Drawing Sheets

CONSTANT SPEED AND FREQUENCY GENERATING SYSTEM

BACKGROUND OF THE INVENTION

1. Field of the Invention

This invention relates to electrical generating systems, and particularly to a generating system that is capable of setting and producing a constant frequency AC power output from a varying frequency AC input power source, and riding through a short duration power outage.

2. Description of the Prior Art

Equipment which belongs to the same general category as this invention is already on the market and a number of patents exist. Among these are U.S. Pat. No. 4,625,160 by Hucker and U.S. Pat. No. 4,246,531 by Jordan. In the apparatus of Hucker, a variable speed motive power source is coupled mechanically by shaft to a motor and to a generator. The frequency of the generator output is controlled by using signal transformers to transfer signals from a cycloconverter, which is mounted off the shaft, to the rotor windings. In the apparatus of Jordan, a prime mover is coupled by shaft to a generator having an exciter and main unit connected sequentially along the prime mover output shaft. A rotating device exciter is used to generate a frequency difference signal for the generator. Another approach is the system of Ford, U.S. Pat. No. 3,183,431, where the output frequency of the system is maintained constant by changing the frequency of the excitation. The signal is generated by another rotating machine with no static interface. U.S. Pat. No. 4,330,743 by Glennon utilizes a static AC to DC converter which senses motor position. In the apparatus of Gritter, U.S. Pat. No. 4,041,368, a static, non-rotating AC-DC-AC converter is utilized to maintain a constant motor output frequency. U.S. Pat. No. 2,854,617 by Johnson utilizes magnetically coupled devices that vary the field frequency of an alternator and thereby control the output frequency. Alexanderson in U.S. Pat. No. 2,213,945 uses slip rings and external drive circuits to provide signals for controlling AC output frequency. In U.S. Pat. No. 3,764,815, Habock et al. use an externally mounted static frequency converter to control the speed of a gas turbine starter motor.

In the foregoing patents, the control circuit is mounted off and apart from the rotating machine and senses the output voltage and frequency at the load point. Consequently, control of the generator frequency is extremely sensitive to load changes and variations. Furthermore, control of an exciter driving circuit through rotating transformers as typified by the system of Hucker is inefficient and constitutes a weak linking point.

In the foregoing patents, the generator output frequency is fixed and no provision is made for adjusting the output frequency over a given range. If the input AC power should undergo a short time power outage, the described systems will decrease their speed of rotation and the output frequency will drop significantly. Thus, there exists a need for an improved constant speed and frequency system that is not sensitive to load changes and variations; whose output frequency can be selected and adjusted over a given range, and which can ride-through a short time power outage while maintaining the output frequency constant.

SUMMARY OF THE INVENTION

The invention comprises a motor-generator system that includes exciter circuits, an input power factor control, an output frequency control circuit and an output voltage generator. The frequency control circuit is mounted on the rotating shaft connecting the motor and generator and acts to compensate for a varying AC input frequency and voltage by outputting signals to the motor field rotor winding causing the rotor and shaft to move at a constant speed, and receiving feedback signals from the generator, resulting in a constant frequency generator AC output. This feature also maintains the generator output frequency constant during short term input power outages. Provision is made for adjusting the output frequency to any set point over a range.

Accordingly, it is a principal object of this invention to provide an improved constant speed and frequency generating system that is insensitive to varying AC input frequency and to load changes.

Another object is to provide a means of adjusting the output frequency over a given range.

Another object is to provide a means of control that will allow the Motor-Generator system to ridethrough an input power outage without the use of large inertial mass or other energy storage.

Yet another object is to provide a reliable method and system of output frequency control that is to subject to mechanical breakdown.

Further objects and advantages of the invention will become apparent from a study of the following portion of the specification, the claims and the attached drawings.

DESCRIPTION OF THE PREFERRED EMBODIMENTS

Figure 1:
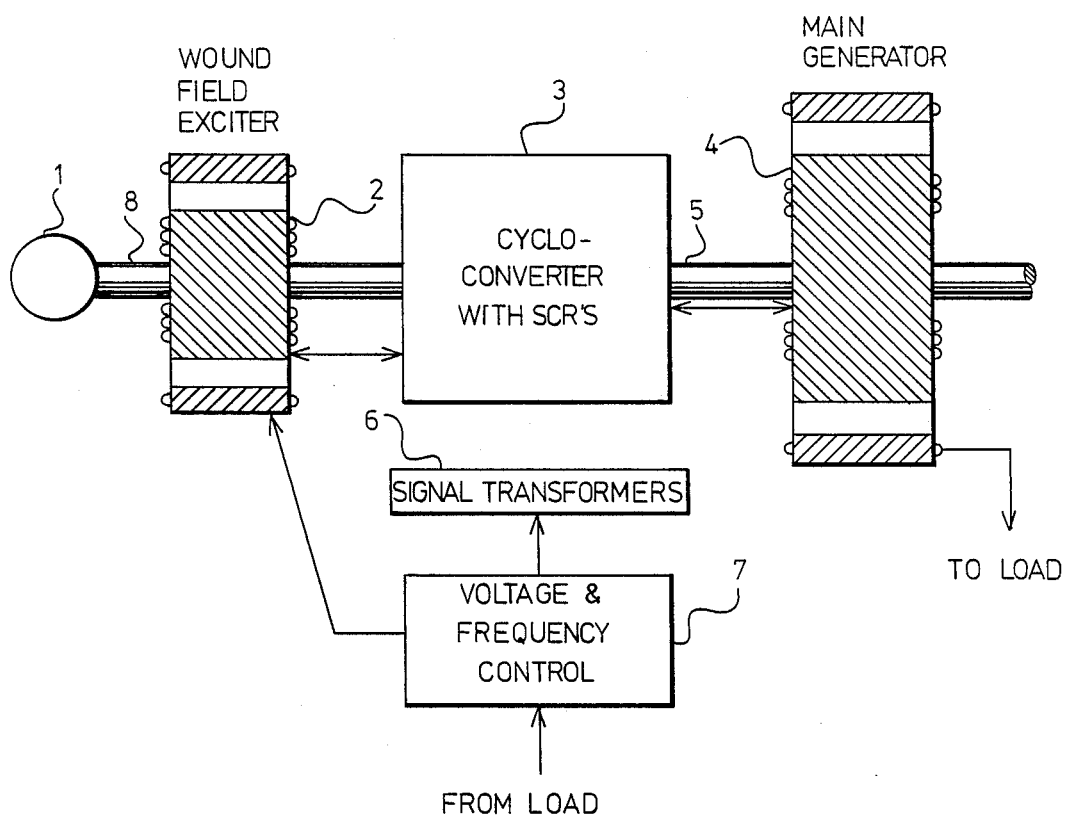
FIG. 1 is a b diagram of a prior art frequency control system.

Referring now to FIG. 1, there is shown a prior art generating system to control output frequency. The prime mover 1 which is an electrical motor, engine or turbine, rotates the shaft 5 at variable speeds to develop a constant frequency AC voltage to the load. A wound field exciter 2 supplies low frequency power to the wound generator field to compensate for the change of speed. The frequency supplied to the rotor is defined by the following equation:

$$f_1 \genfrac{}{}{0pt}{}{\text{mag.}}{\text{flux}} = f\left(\begin{array}{c}\text{rotor}\\ \text{mech.}\\ \text{rotation}\end{array}\right) \pm f(\text{exciter}) \qquad \text{(eqn 1)}$$

The frequency of the magnetic flux f, is kept at a synchronous value in accordance with the number of generator poles. That is, the number of poles $P_n$ is a function of synchronism. The exciter output frequency is dependent upon the rotational speed of the shaft. The voltage and frequency control circuit 7 is mounted outside the machine and senses output voltage and frequency at the load point. The control circuit 7 output signals are transformed via a rotating signal transformer 6 to a shaft mounted cycloconverter 3 or other type driving circuit, that converts the frequency of the exciter 2 power and delivers power to the field windings of the generator rotor 4, controlling its frequency.

As noted earlier, disadvantages of this prior art approach are as follows:

1. The control of generator output frequency is extremely sensitive to load changes and variations.

2. Control of the exciter driving circuit (the cycloconverter) through rotating transformers is inefficient and subject to mechanical breakdown.

Figure 2:
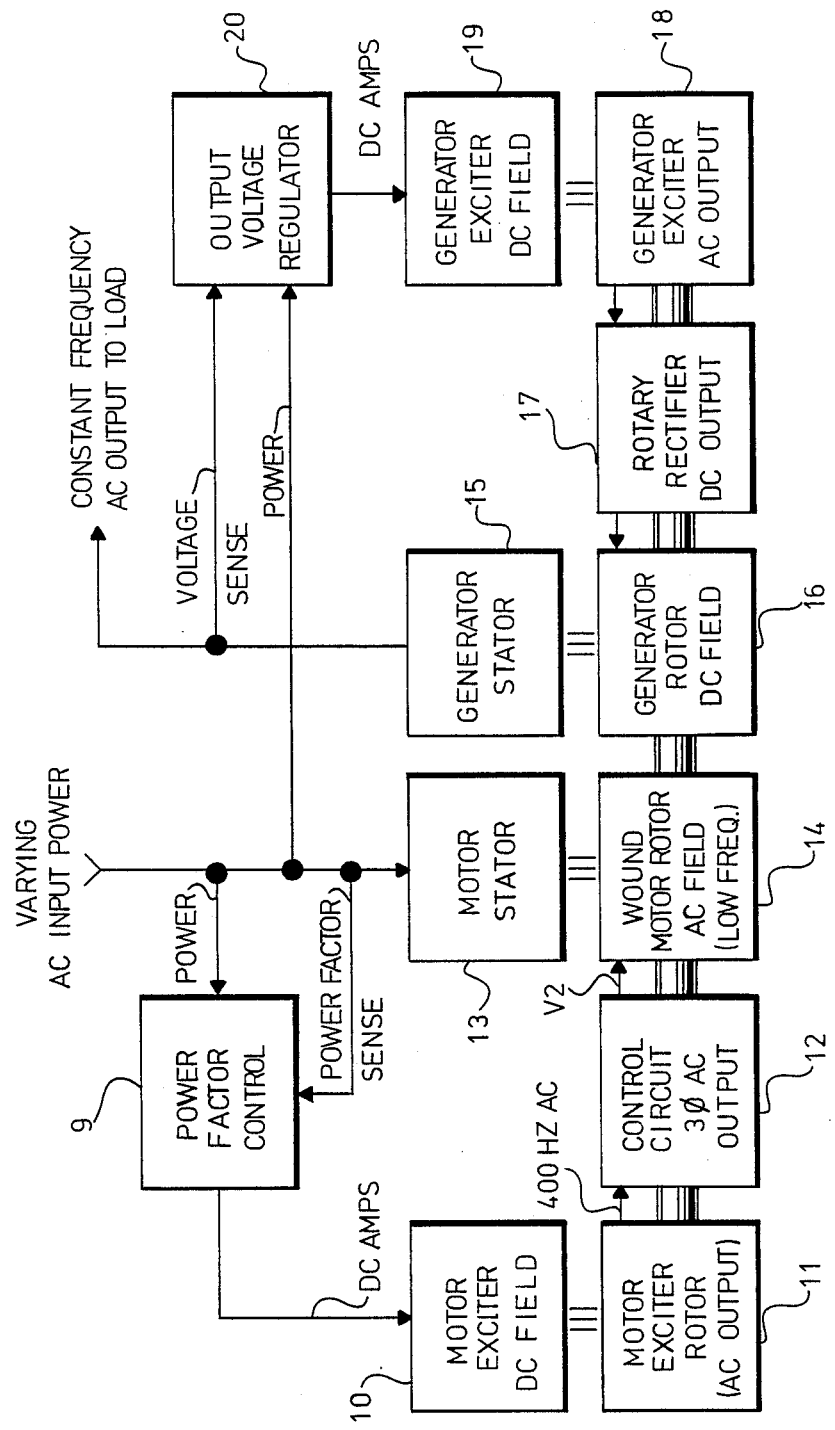
FIG. 2 is a block diagram of a motor-generator system embodying control circuit and method of the present invention.

Referring now to FIG. 2, there is shown a block diagram of a constant speed and frequency generating system embodying the control circuit and method of the present invention. The system comprises a power factor control circuit 9, a motor exciter DC field 10, a motor exciter rotor 11, a control circuit 12, a motor stator 13 and wound motor rotor AC field 14, a generator stator 15 and rotor DC field 16, a rotary rectifier 17, a generator exciter rotor 18 and exciter DC field 19, and an output voltage regulator 20.

In operation, the motor exciter field 10, which is stator mounted, is fed from a power factor control circuit 9 that provides DC voltage to the field. The power factor control circuit 9 senses the input AC power factor supplied to the motor and produces modifying DC voltage that causes the motor exciter to respond to a unity power factor input. The armature of the exciter 11 is shaft mounted on a rotor and supplies high frequency 400 Hz AC three-phase voltage to the shaft mounted frequency control circuit 12. The frequency control circuit 12 generates low frequency three-phase power that is fed into the wound motor rotor 14. The motor stator 13 three-phase winding is connected to the main AC input power. When the frequency of the main AC input power varies, the rotating speed of the motor rotor 14 and thereby the motor shaft will also vary, and as a result, the output frequency of the generator will change accordingly. Now the reason for the variation in the rotating speed of the motor shaft lies in the fact that the magnetic flux which is generated by the input AC power is rotating at a speed defined by:

$$p \times n_s = f \quad \text{(eqn 2)}$$

where p = number of motor pole pairs
f = frequency of electrical input power
$n_s$ = rotation/sec. of magnetic flux The varying frequency (f) of the electrical input power will change the rotational speed ($n_s$) of the flux because p is a constant number. If we assume that the input power frequency is increased, the rotating flux will move faster in the gap and thus pull the rotor shaft, accelerating to a higher rotational speed. In order to reduce the rotor speed to its original speed, the control circuit 12 is required to impress a voltage $V_2$ with positive frequency on the wound motor rotor 14. The speed of the motor shaft must drop to its ns value because in order to generate torque, both fluxes for the stator and rotor must move at the same rotational speed. Frequency control is further defined by the following equation:

$$f_{control} = \left( \frac{n \text{ flux} - n \text{ rotor}}{n \text{ flux}} \right) \times f_{stator} \quad \text{(eqn 3)}$$
$$= \Delta f_{stator}$$

If the frequency of the stator is synchronous, the control circuit 12 will feed the motor rotor 14 with a DC voltage (f control = 0) of $V_2 = V_{dc}$. If the AC input frequency decreases by an amount equal to f, the rotor speed also decreases. To return the rotor speed to its original $n_s$ equivalent, the control circuit 12 impresses a voltage $V_2$ on the wound motor rotor 14 that lowers $f_{control}$ by $\Delta$ f. The manner in which this is done is explained in the description of the frequency control circuit 12. The result is that variations in the generator output frequency are corrected immediately and the frequency remains constant.

The generator depicted in FIG. 2, and defined by blocks 15, 16, 17, 18, 19 and 20, is preferably a salient pole synchronous type, with the load frequency being directly related to the speed of the generator shaft. The generator rotor DC field 16 is supplied by the rotary rectifier 17 and the exciter rotor 18. An output voltage regulator 20 that senses generator output voltage, controls the generator voltage by excitation level current provided to the generator exciter DC field 19 that is in turn, coupled magnetically to the generator exciter rotor 18.

Figure 3:
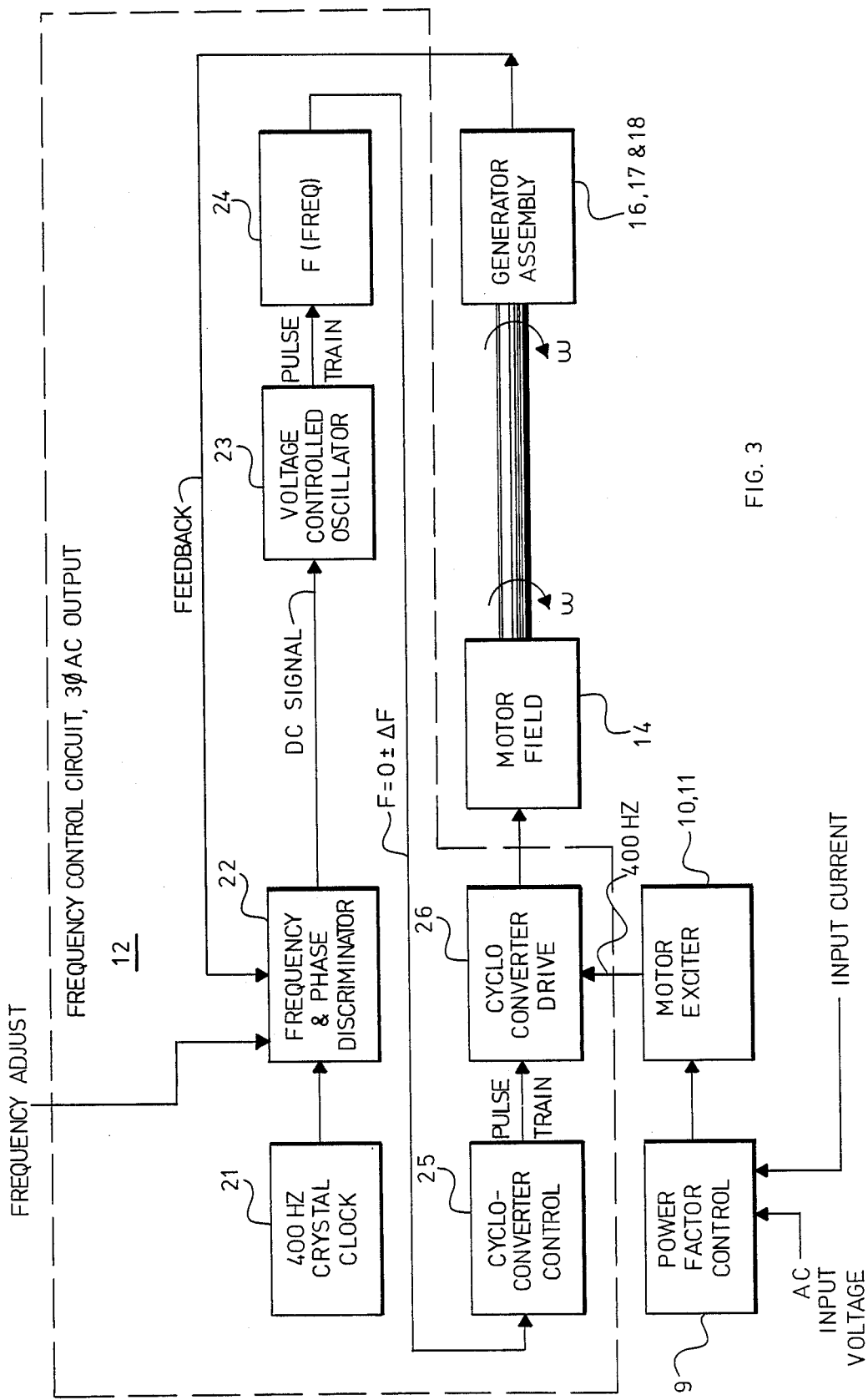
FIG. 3 is a block diagram of a preferred embodiment of the control circuit and its relationship to a motor generator system according to the present invention.

Refer to FIG. 3, which is a block diagram of the frequency control circuit 12 and its relationship to the motor generator system. The frequency control circuit 12 can be set to control a 400 Hz generator output frequency to within ±0.1 Hz of its target value.

A 400 Hz crystal clock circuit 21, that comprises a crystal oscillator and counting circuit, delivers a precise 400 Hz square wave voltage signal to the frequency and phase discriminator 22. A frequency setting reference signal is set by the Motor-Generator control panel and is input to the frequency and phase discriminator 22. The frequency and phase discriminator 22 also receives a feedback signal corresponding to the frequency of the generator output 16. The feedback signal is compared with the 400 Hz crystal clock signal and its reference setting by the frequency and phase discriminator 22 and a DC error signal is output. This DC error signal is input to a voltage controlled oscillator 23 (VCO) which produces a high frequency pulse train that is proportional to the input DC error signal. The pulse train output by the VCO is operated on by a frequency dependent circuit 24 which produces a three-phase sinusoidal output, variable to ±4.8 Hz. This is a reference voltage which is utilized by a converter means comprising, as illustrated in FIG. 3, a cycloconverter control 25 and cycloconverter drive 26. Cycloconverter control 25 produces pulse trains that are transmitted to the SCR gates in the cycloconverter drive 26. The output of the cycloconverter drive 26 ranges from 0 to plus or minus 4.8 Hz at a controllable low magnitude of AC voltage. Voltage control of the motor is indirect, in that it is derived from the action of the input power factor control circuit 9 producing a unity input power factor signal and acting on the motor exciter DC field 10, which couples to the motor exciter rotor 11 that in turn develops an AC voltage signal which is output to the control circuit 12. This establishes the magnitude of AC output voltage from the cycloconverter drive 26 to the wound motor rotor AC field 14. The frequency of operation of the wound motor rotor AC field 14 adds or subtracts from the motor speed to establish that speed required by the motor to operate the generator at the selected output frequency.

It should be noted that instead of the cycloconverter drive 26, rotating electrical frequency converters 50 to 60 Hz or 60 to 50 Hz or other means may be used to perform the function of converting the reference input signal to a $\Delta f$ signal varying from 0 to plus or minus 4.8 Hz. The cycloconverter 26 and its cycloconverter control 25 are a preferred approach.

When an AC input power outage occurs in the form of a 'brownout', that is to say, the input AC voltage dips drastically and input frequency also decreases, the power factor control circuit 9 senses this condition and supplies higher DC current signals to the motor exciter, causing the motor to speed up, countering the effect of falling input voltage and frequency, and thus keeping the generator output frequency constant.

As described earlier, provision is made for adjusting and selecting an output frequency set-point, by inputting a reference signal to frequency control circuit 12. Thus, generator output frequencies can be selected over a given range of the nominal frequency. For example, 400 Hz nominal output frequencies may be set at any value from 390 Hz to 410 Hz; 60 Hz nominal output frequencies may be set at any value from 50 Hz to 70 Hz. The given nominal frequency depends on the generator pole design. The input AC frequency and voltage may vary over a relatively wide range. Thus, the same machine could be used typically for a 50 Hz or 60 Hz input AC power.

From the above description, it is believed that the preferred embodiment achieves the principal and subsidiary objects of the present invention. Alternative embodiments and various modifications of the embodiments depicted and described will be apparent from the above description to those skilled in the art. These and other alternatives are considered to be equivalent and within the spirit and scope of the present invention.

Having described the invention, what is claimed is:

1. In a motor generator system for generating output power controlled to a desired frequency and having a variable AC input power and frequency, the system including a generator and motor, both with rotors connected by a shaft, the system also including a power factor control, a shaft-mounted frequency control circuit, an output voltage regulator, generator and motor exciter DC fields; the power factor control sensing the input power that is supplied to the motor stator and outputting a DC control signal to the motor exciter DC field; said motor having an exciter rotor developing an AC output voltage that is related to the speed of said shaft and outputting this AC output voltage signal to said shaft-mounted frequency control circuit; said frequency control circuit producing a difference ($\Delta f$) low frequency signal that is applied to the motor rotating AC field, to add or subtract from the speed of said motor rotating AC field, causing the motor speed to remain constant and the generator output frequency to remain constant within ±0.1 Hz; said frequency control circuit comprising:

a crystal clock oscillator and counting circuit that delivers a precise square wave voltage signal;

a feedback loop connected to said generator output and transmitting a signal corresponding to said a frequency and phase discriminator to which said feedback frequency signal and a reference setting frequency signal and said crystal clock signal is connected, and producing a DC error signal; a voltage controlled oscillator and frequency dependent circuit that processes said DC error signal, producing a high frequency pulse train that is proportional to said input DC error signal;

a converter means coupled to the output of said voltage controlled oscillator and frequency dependent circuit, that converts the pulse train signal to a difference low frequency signal for application to the motor, controlling the speed of the rotating magnetic flux and thereby also the generator speed and AC frequency output, producing a constant frequency output irrespective of variations in the input AC power frequency to the motor.

2. The frequency control circuit of claim 1, wherein said converter means includes a cycloconverter control circuit and a cycloconverter drive circuit; said cycloconverter control circuit producing pulse trains which are related to the input DC error signal and which are connected to the input of said cycloconverter drive circuit; said cycloconverter drive circuit producing a low frequency voltage output in the range of zero to plus or minus 4.8 Hz at a low magnitude AC voltage for application to the motor AC field, thus controlling said motor speed.

3. The system of claim 1, wherein said power factor control circuit operates to deliver input AC power to the motor at unity power factor.

4. The frequency control circuit of claim 1, wherein said converter means includes a rotating electrical frequency converter of 50 to 60 Hz, or 60 to 50 Hz, said frequency converter producing a low frequency voltage output in the range of zero to plus or minus 4.8 Hz at a low magnitude AC voltage for application to the motor AC field.

* * * * *